Figure 1:
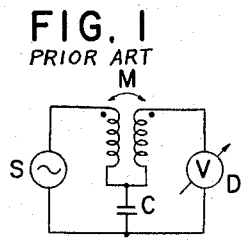

Nov. 15, 1966  KENICHI ISODA ET AL  3,286,160
FREQUENCY BRIDGE
Filed Oct. 23, 1963

Kenichi Isoda & Kiyokata Matsumura
INVENTORS
BY Mustern & Mustern

United States Patent Office 3,286,160
Patented Nov. 15, 1966

3,286,160
FREQUENCY BRIDGE
Kenichi Isoda, Kitatama-gun, Tokyo-to, and Kiyokata Matsuura, Chikusa-ku, Nagoya-shi, Japan, assignors to Kabushiki Kaisha Hitachi Seisakusho, Tokyo-to, Japan, a joint-stock company of Japan
Filed Oct. 23, 1963, Ser. No. 318,213
Claims priority, application Japan, Oct. 25, 1962, 37/46,492
1 Claim. (Cl. 323—76)

The present invention relates to frequency bridges of the type known as the Campbell's bridge. More particularly, the invention relates to a new and improved frequency bridge of this type having highly desirable and advantageous characteristics.

It is an object of the invention to provide, in a Campbell type frequency bridge, an arrangement and combination of parts such as to obtain a linear relationship between the balance frequency of the bridge and the displacement of the movable member of the variable mutual inductance of the bridge.

Other objects and advantages of the invention will presently become apparent.

Figure 2:
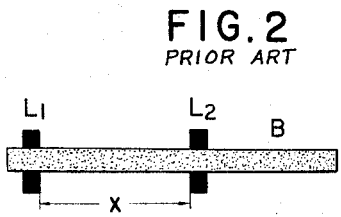
Figure 3:
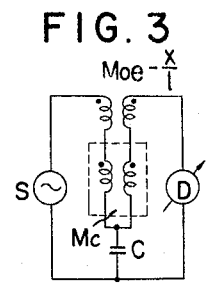
Figure 4:
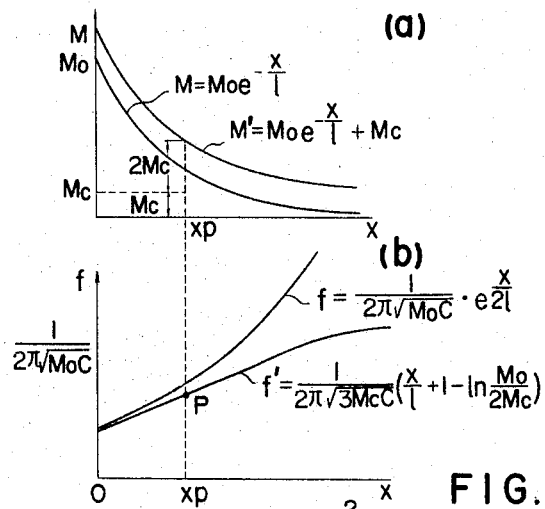
Figure 5:
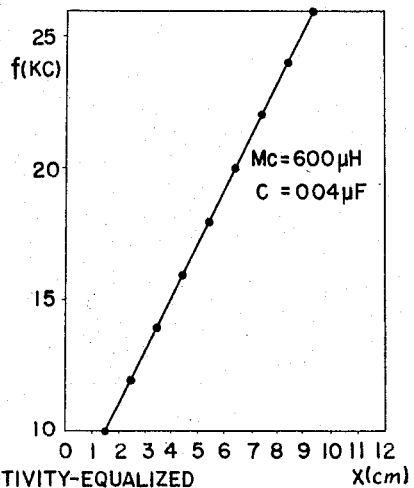
Figure 6:
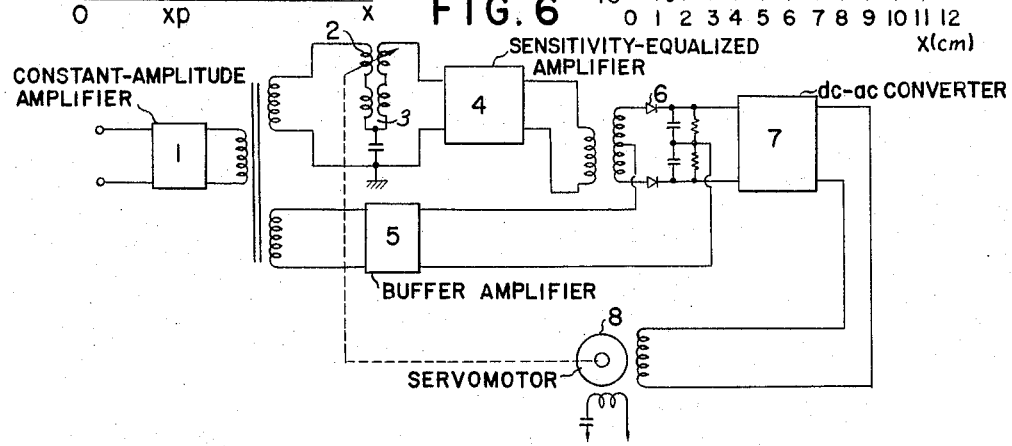

The nature, principle, and details of the invention, as well as the manner in which the foregoing objects may best be achieved will be most fully understood by reference to the following description taken in conjunction with the accompanying drawings in which like parts are designated by like reference characters, and in which:

FIG. 1 is an electrical connection diagram showing a Campbell's frequency bridge of conventional type;

FIG. 2 consists of an elevational view, in vertical section, and an elevational end view, showing the construction of the movable member of a conventional Campbell's bridge;

FIG. 3 is an electrical connection diagram showing a preferred embodiment of the frequency bridge according to the invention;

FIGS. 4(a) and 4(b) are graphical representations showing comparative characteristic curves of the conventional device and that of the present invention;

FIG. 5 is a graphical representation indicating a specific example of a linearized curve of balance frequency versus movable coil displacement; and FIG. 6 is an electrical connection diagram showing an example of a frequency recorder to which the frequency bridge according to the invention is applied.

Referring now to FIG. 1, if balance is established in a conventional Campbell frequency bridge for measuring the frequency of an A.C. power source S by varying the value of the variable mutual inductance M (H) and rendering the voltage applied on detector D zero, the frequency $f$ (kc.) of the power source S can be expressed by the following equation.

$$f = \frac{1}{2\pi\sqrt{MC}} \quad (1)$$

wherein C ($\mu$f.) is the capacitance of the capacitor designated by the same reference character in FIG. 1.

The present invention contemplates linearizing the relationship between the displacement of the movable member of the variable mutual inductance M in the abovementioned Campbell's bridge and the balance frequency expressed by the Equation 1. For this purpose, by the present invention, the constant value of a series-connected, fixed mutual inductance is added with respect to the variable mutual inductance.

One example of a movable member of the bridge is shown in FIG. 2 to have a magnetic core bar B having a constant cross sectional area such as, for example, a ferrite bar or a permalloy winding core, a fixed coil $L_1$ fixed on and about one end of the magnetic bar B, and a movable coil $L_2$ free to move in the axial direction on the bar B.

The relationship of the mutual inductance M between the coil $L_1$ and $L_2$ to the distance $x$ between the coils $L_1$ and $L_2$ is given approximately by the following equation in the case when the length of the magnetic bar B is considerable.

$$M = M_0 e^{-\frac{x}{l}} \quad (2)$$

where $M_0$ is the mutual inductance between the coils $L_1$ and $L_2$ when $x=0$, and $l$ is a constant which is determined by various factors such as the material of the magnetic bar B, dimensions, and the shape of the coils and is called the "length constant."

If it is assumed that the variable mutual inductance shown in FIG. 2 is used in the frequency bridge shown in FIG. 1, Equation 2 can be substituted in Equation 1 to produce the following equation.

$$f = \frac{1}{2\pi\sqrt{C}} \cdot M^{-\frac{1}{2}} = \frac{1}{2\pi\sqrt{M_0 C}} \cdot e^{\frac{x}{2l}} \quad (3)$$

This equation indicates that the relationship between the balance frequency $f$ of the bridge and the displacement $x$ of the movable coil relative to the fixed coil is not linear. Therefore, in order to linearize this relationship, the present invention provides a circuit arrangement wherein a fixed mutual inductance $M_c$ is inserted in series connection with the variable mutual inductance as indicated in FIG. 3. By this arrangement, the variation of the mutual inductance with respect to the displacement $x$, indicated by the curve M in FIG. 4(a), is changed into that indicated by curve M'. Accordingly, the variation of the balance frequency as indicated by curve $f$ in FIG. 4(b) is changed into that indicated by curve $f'$. As a result, the relationship between the balance frequency and the displacement can be linearized over a substantially wide range.

That is, by so inserting the fixed mutual inductance $M_c$, the value $x_p$ of the displacement which produces the condition expressed by $$\frac{d^2 f}{dx^2} = 0 \quad (4)$$

becomes $$X_p = l \cdot l_n \frac{M_0}{2M_c} \quad (5)$$

The frequency $f_p$ corresponding to the point of inflection becomes $$f_p = \frac{1}{2\pi\sqrt{3M_c C}} \quad (6)$$

and the rate of variation of frequency with respect to displacement corresponding to the Equation 4 becomes $$\left(\frac{df}{dx}\right)_{x=x_p} = \frac{1}{2\pi\sqrt{3M_c C}} \cdot \frac{1}{l} \quad (7)$$

Therefore, the relationship between the frequency $f$ and the displacement $x$ is expressed by the following equation.

$$f = \frac{1}{2\pi\sqrt{3M_c C}} \left(\frac{x}{l} + 1 - l_n \frac{M_0}{2M_c}\right) \quad (8)$$

A specific example of a curve of balance frequency versus movable coil displacement, which curve has been linearized according to the invention, is shown in FIG. 5. In this example, the various constants were selected as follows: $l$, approximately 3.04 cm.; $M_0$, approximately 8.4 mh.; $M_c$, 600 $\mu$h.; and C, 0.04 $\mu$f. Accordingly, by providing the movable coil displacement with an equally spaced scale, the frequency can be read directly.

Further, while the output voltage of this frequency bridge becomes zero at the balance point, its magnitude before and after this point is approximately proportional to the deviation from the balance point of the bridge, and its phase is reversed on opposite sides of the balance point. By utilizing this property of the bridge and using a servo-system as indicated in FIG. 6, it is possible to cause the input frequency to be followed up, whereby the bridge can be automatically balanced.

The circuit arrangement shown in FIG. 6 is one example of application of the frequency bridge according to the invention to a recorder. The principal parts of this circuit are: a constant-amplitude amplifier 1; the frequency bridge according to the invention comprising a variable mutual inductance 2, a fixed mutual inductance 3, and a capacitor; a sensitivity-equalized amplifier 4; a buffer amplifier 5; synchronous rectifiers 6; a D.C.-A.C. converter 7; and a servo-motor 8, which is coupled mechanically to the variable mutual inductance 2. Since by the use of such an arrangement the displacement of the movable coil and the frequency vary linearly with respect to each other, a record of an input frequency can be made on a linear-scale recording paper.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What is claimed is:

A frequency bridge which comprises a first inductance consisting of magnetically coupled primary and secondary windings, wherein mutual inductance between the primary and secondary windings are freely variable; second inductance means, wherein mutual inductance between the primary and secondary windings are fixed; a capacitor; means to connect in series the respective primary windings of said first and second inductance means with said capacitor; and means to connect in series the respective secondary windings with said capacitor, whereby a signal is applied to the series-circuit formed by said primary windings of said first and second inductance means and said capacitor, thereby obtaining summation of voltage caused across the terminals of said capacitor and of voltage induced in the secondary windings of said respective first and second inductance means.

References Cited by the Examiner

UNITED STATES PATENTS

| | | | |
|---|---|---|---|
| Re. 22,195 | 10/1942 | Harnett | 323—53 X |
| 2,603,754 | 7/1952 | Hansen | 324—81 X |
| 2,908,864 | 10/1959 | Shepard | 323—60 X |

FOREIGN PATENTS

| | | |
|---|---|---|
| 228,337 | 2/1925 | Great Britain. |
| 571,005 | 8/1945 | Great Britain. |

JOHN F. COUCH, *Primary Examiner.*

A. D. PELLINEN, *Assistant Examiner.*